United States Patent [19]

Stasi

[11] 4,021,024
[45] May 3, 1977

[54] PERFORATED BAFFLE-IMPELLER AND PROCESS OF CONCENTRATING DENSE MASSES

[75] Inventor: Michael A. Stasi, Chicago, Ill.

[73] Assignee: Standard Oil Company (Indiana), Chicago, Ill.

[22] Filed: Apr. 12, 1976

[21] Appl. No.: 675,734

[52] U.S. Cl. .................................. 259/109; 259/9; 259/25; 259/45; 259/106; 259/182; 416/181; 416/231 A
[51] Int. Cl.² ...................... B01F 7/02; B01F 7/00
[58] Field of Search ............... 259/42, 7, 9, 22, 25, 259/40, 41, 45, 106, 109, 102, 103, 182; 416/16, 19, 90, 92, 179, 181, 182, 223, 227, 228, 231

[56] References Cited

UNITED STATES PATENTS

| 67,205 | 7/1867 | McTarnahan | 416/181 |
| 1,521,044 | 12/1924 | Parker | 259/109 |
| 3,652,063 | 3/1972 | Lawson et al. | 259/109 |

Primary Examiner—William Price
Assistant Examiner—Steven M. Pollard
Attorney, Agent, or Firm—Reed F. Riley; Arthur G. Gilkes; William T. McClain

[57] ABSTRACT

Vessel internals comprising at least one novel perforated, baffle-impellor combination attached to rotatable drive shaft are disclosed for use in a stirred, horizontal vessel containing solid particulate matter. Using such internals, dense masses present in such particulate can be efficiently concentrated towards one end of said vessel while maintaining in-place mixing of the particulate matter.

16 Claims, 3 Drawing Figures

PERFORATED BAFFLE-IMPELLER AND PROCESS OF CONCENTRATING DENSE MASSES

SUMMARY OF THE INVENTION

This invention relates to internals for a stirred, horizontal vessel comprising at least one novel perforated, baffle-impellor combination attached to a rotatable drive shaft by which dense masses contained in solid particulate matter present in said vessel can be efficiently concentrated by movement of the masses in one direction and, more particularly, to stirred-horizontal-vessel internals comprising at least one perforated baffle or barrier attached to a rotatable drive shaft, each baffle essentially filling the cross-sectional area of the containing vessel and in intimate combination with a specially placed, forwardly located impellor, said impellor containing one or more paddles; and a process whereby dense masses contained in solid, particulate matter present in said vessel can be efficiently and continuously concentrated toward one end for removal.

In accordance with the instant invention, there is described herein (1) internals for a stirred, horizontal vessel of substantially circular cross-section comprising:
 a. a rotatable, centrally located drive shaft passing longitudinally through said vessel to which is attached a plurality of impellors, which impellors cause essentially no forward or backward movement of solid particulate matter contained in said vessel and extend transversely within and to a short distance from the internal surfaces of said vessel;
 b. at least one baffle attached to said shaft, each baffle essentially filling the cross-sectional area of said vessel and having at least two openings positioned in adjacent quadrants of said baffle, one of said openings at the periphery of said baffle and another interior to said periphery; and
 c. one forwardly and one backwardly located impellor having at least one paddle each associated with each baffle, each of said forwardly and backwardly located impellors closely spaced in respect of and rotating with said baffle, said backwardly located impellor so disposed in respect of said peripheral opening that dense masses engaged by said impellor tend to move through said peripheral opening only in the forward direction and said forwardly located impellor so disposed in respect of said interior opening that dense masses engaged by said impellor tend not to move through said interior opening in the backward direction and (2) a process for concentrating dense masses contained in solid particulate matter within a substantially circular cross-section, stirred, horizontal vessel comprising:
 a. rotating a centrally located drive shaft passing longitudinally through said vessel to which is attached
  i. a plurality of impellors, which impellors cause essentially no forward or backward movement of said particulate, the paddles of said impellors extending transversely within and to a short distance from the internal surfaces of said vessel, and
  ii. at least one baffle, each baffle essentially filling the cross-sectional area of said vessel and having at least two openings positioned in adjacent quadrants of said baffle, one of said openings at the periphery of said baffle and another interior to said periphery;
 one forwardly and one backwardly located impellor associated with each baffle each having at least one paddle, each of said forwardly and backwardly located impellors closely spaced in respect of and rotating with said baffle, said backwardly located impellor so disposed in respect of said peripheral opening that dense masses engaged by such impellor tend to move through said peripheral opening only in the forward direction and said forwardly located impellor so disposed in respect of said interior opening that dense masses engaged by said impellor tend not to move through said interior opening in the backward direction; and (b) removing dense masses towards one end of said vessel.

BACKGROUND OF THE INVENTION

In reactions in which solid particulate is continuously formed which can concentrate into aggregates it is often desirable to remove such aggregates from the particulate because they are an unwanted product and/or produce fowling of the reactor and/or downstream processing equipment. This is particularly true in a stirred, vapor phase polymerization reactor wherein a small number of dense aggregates formed by local overheating of the polymer particulate matter during operation can cause seizing of the stirrer blades and shut-down of the entire polymerization process. Now a method has been found by which such aggregates or more generally, masses, can be concentrated efficiently towards one end of such reactor to be removed before their number and/or size are large enough to produce process problems.

SHORT DESCRIPTION OF THE DRAWING

STATEMENT OF THE INVENTION

Figure 1:
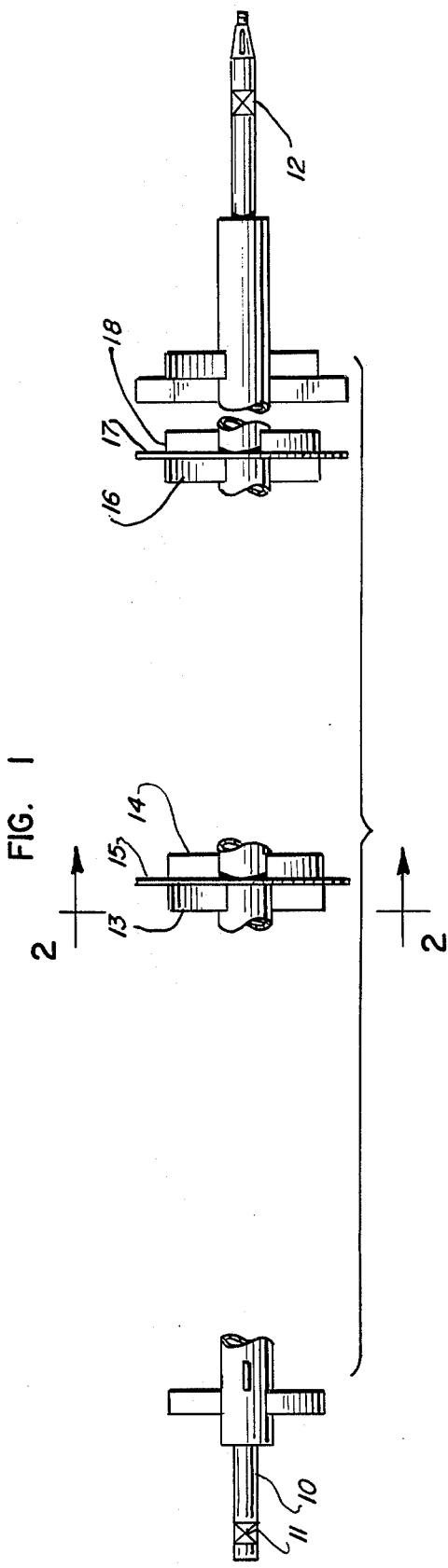
FIG. 1 shows vessel internals employing two baffle-impellor combinations; all of the adjacently located mixing impellors and drive shaft are not shown.

The structural material of the vessel, preferably a reactor and, most preferably, a polymerization reactor, can be of any material dimensionally stable under the conditions of vessel operation. The same is true for the structural material of the internals. Carbon steel is preferred for a polymerization reactor operating above ambient pressure and temperature.

The reactor is preferably of substantially circular cross-section and the rotatable drive shaft to which the one or more baffle-impellor-combinations are attached is preferably centrally located and extends longitudinally through the reactor being supported at either end of the reactor.

The baffle-impellor combinations and mixing impellors are securely attached to the drive shaft such that they rotate with the shaft and are of sufficient thickness so that they are of the necessary dimensional stability. The baffle impellors, and preferably, all impellors extend transversely within the cross-sectional area of the vessel to a short distance from the vessel's internal surfaces. The clearance between the baffles and impellors and the internal surfaces of the reaction is preferably as small as is consistent with good mechanical operation and favorable construction economics. The impellors are so constructed and placed along the drive shaft that essentially no forward or backward movement of the particulate occurs, i.e., no gross backmixing of the particulate bed occurs.

Associated with each baffle is one forwardly and one backwardly located impellor each having at least one paddle. Both impellors and baffle are attached to the shaft such that they rotate as a unit. Favorably, the backwardly and forwardly located impellors are attached by welding or otherwise to the baffle. Preferably the paddles extend transversely inside the vessel to within a short distance from the internal vessel surfaces so that effective stirring is produced and dense masses within the particulate bed are effectively engaged by the paddle surface during the time the paddle is in the particulate bed. Preferably, the paddles are flat and of width large enough for effective stirring and engagement of dense masses or aggregates within the particulate bed. Thus, the paddles cause essentially no forward or backward movement of the bed, i.e. no gross backmixing of the particulate bed is produced but particulate dense masses can pass through each baffle in the forwardly direction and particulate can pass through the baffle in the backwardly direction.

Preferably, other impellors attached to the drive shaft having at least one paddle each are present for mixing purposes. More preferably, a plurality of adjacently located impellors so displaced along the length of the drive shaft to produce in place mixing (no gross backmixing) are employed. Preferably, each impellor contains two paddles disposed at about 180° to each other and each impellor is angularly offset with respect to the two adjacently located impellors. Good mechanical operation requires the impellors to be balanced for any substantial drive shaft length.

Each baffle has at least one opening at the periphery so located with respect to the backwardly located impellor that dense masses contained in the bed of particulate matter can pass essentially only in the forward direction through the peripheral opening. Also, each baffle has at least one bed height equalizing interior opening so located with respect to the forwardly located impellor that a minimum number of the total masses passing through the baffle will pass through the interior opening in the backward direction. Preferably, each baffle has one peripheral opening and one interior opening of about equal areas. Preferably, the total area of the openings is between about ten and about fifty percent of the area of the baffle and, more preferably, the total area is between about twenty and forty percent of the baffle area.

The size and shape of the openings is not critical but should be large so that the rate of passage of the masses is adequate for the purpose and that the net flow of particulate matter across a baffle tends toward zero. The size, shape and relative location of the openings can depend also upon flow characteristics of the particulate matter and the size and relative density of the masses.

Preferably, the masses are aggregates, more preferably, aggregates of polymer in a polymer particulate bed. Preferably, the masses are dense enough that they do not float on the surface of the agitated particulate bed but tend to be distributed in the bottom three-quarters or, more preferably, bottom half of the bed during agitation. In the case where particulate polyethylene is the bed, the particulate density runs between about 0.4 to about 0.6 grams per milliliter and the mass density runs between about 0.6 and about 0.9. When the bed is particulate polypropylene the corresponding numbers are about 0.25 to about 0.45 and about 0.6 to about 0.95. Particle size of the particulate bed is not critical but a reasonable difference should exist between the particulate particle size and the size of the dense masses.

A particularly suitable horizontal reactor for the apparatus, vessel internals and process set forth herein is set out in U.S. application Ser. No. 642,583, filed Dec. 19, 1975, the contents of which are specifically incorporated by reference herein.

Referring now to FIG. 1, adjacently located, angularly offset, two paddle impellors are attached along most of the length of drive shaft 10, some of which is not shown. Bearings for rotation of the shaft are shown at 11 and 12 where the shaft is attached to the vessel. Two baffles 15 and 17 divide the reactor into three sections together with a false end plate (not shown) at one end and a take-off baffle (not shown) at the other end. The most forwardly located section (in the direction of concentration) being the smallest. Baffles 15 and 17 and all impellors rotate as a unit with drive shaft 10. Backwardly located impellors 13 and 16 are situated in contact with baffles 15 and 17 and, as one paddle on each impellor sweeps up through the particulate bed, masses and particulate carried up on such paddle have an approximately fifty-fifty chance of falling through the peripheral opening of the baffle in the concentration direction. Forwardly located impellors 14 and 18, situated in contact with baffles 15 and 17, are so placed with respect to the interior opening in each baffle that mass or particulate engaged by impellors 14 and 18 tend not to fall through the interior opening but remain in the section. The baffles thus function as one-way doors for dense masses. The function of the interior openings is to help equalize the bed level on either side of the baffle in combination with the peripheral opening, i.e., to pass particulate but no significant number of masses.

Figure 2:
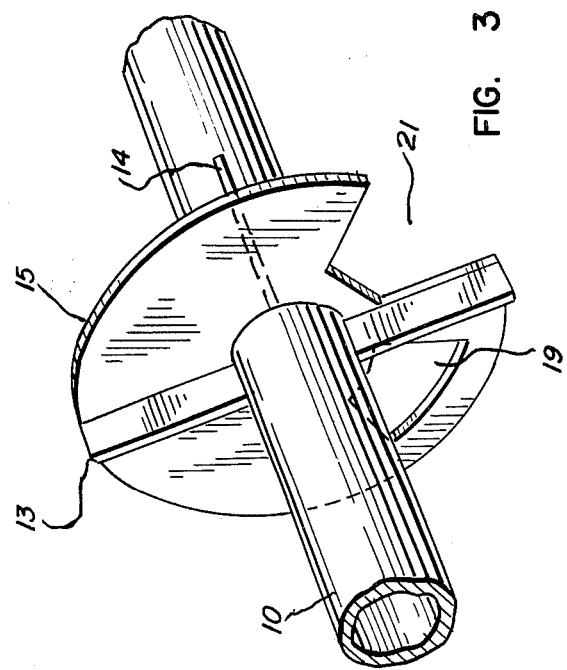
FIG. 2 shows the details of a baffle-impellor combination along line 2—2 of FIG. 1. The baffle contains one interior and one peripheral opening and the forwardly and backwardly located impellors, angularly off-set by 90°, both have two paddles each, which paddles are disposed 180° to each other.
Figure 3:
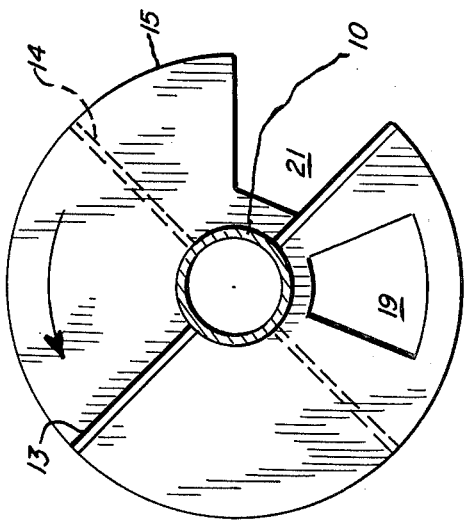
FIG. 3 is a perspective view of the baffle-impellor combination of FIG. 2.

FIG. 2 is a cross-sectional view of baffle 15 looking in the concentration direction. The two-paddle impellors 13 and 14 are backwardly located and forwardly located with respect to baffle 15, respectively. Peripheral opening 21 is cut in the form of a truncated sector and one side of the sector 21 is flush with impellor 13 and runs a substantial way along the length of one paddle of 13 so that masses and particulate easily pass through the peripheral opening in the concentration direction. Interior opening 19 also cut in the form of a truncated sector is set in from the periphery and up, in the direction of rotation, from forwardly located impellor 14 so that interior opening 19 acts as a leveling device helping equalize the bed heights in each section. Dense masses and particulate engaged by impellor 14 as it passes through the particulate bed tend to fall off the paddles back into the section.

While the invention is described in connection with the specific Examples below, it is to be understood that these are for illustrative purposes only. Many alternatives, modifications and variations will be apparent to those skilled in the art in the light of the below Examples and such alternatives, modifications and variations fall within the scope and spirit of the appended claims.

EXAMPLE I

A three feet in length by two feet in diameter vessel with a motor driven drive shaft on which adjacent, two paddle impellers were attached was employed. The two paddles of each impellor were disposed at 180° with respect to each other and each impellor was angularly off-set by 90° with respect to the next adjacent impellors. Each paddle width was six inches and the end of each paddle just cleared the interior surfaces of the vessel. Two square peripheral and two square interior openings were cut in the single baffle used and were each 3×3 inches in size. The two peripheral openings were cut so that one side of each square opening was flush with a paddle of the backwardly located impellor and another side of the square opening with the continuation of the circumference of the baffle. The two interior openings were cut so that the nearest side (to the forwardly located impellor) of each opening was 3 inches ito its quadrant as measured perpendicularly from the flat surface of the forwardly located impellor. Thus, one opening was cut in each of the four quadrants of the baffle. The vessel contained seven two-paddle impellors counting the two fixed to the baffle. The baffle was attached to the drive shaft between the fourth and fifth impellor.

The vessel was at all times about half-filled with particulate polyethylene of average mesh size 40 to 70 and polyethylene introduced at about 60 pounds per hour. Continuous discharge of the polyethylene at the same rate was by overflow of a weir located at one end of the vessel and removed through a bottomly located valve in the vessel. Twelve fused polyethylene aggregates were present initially in the backwardly located section of the particulate bed. The drive shaft was rotated at about 15 RPM.

TABLE

| Time (minutes) | No. of Aggregates Moved Between Sections |
|---|---|
| 6 | 2 |
| 15 | 6 |
| 30 | 7 |
| 60 | 8 |
| 120 | 11 |

The above test was repeated in the same way except that this time all the aggregates were in the forwardly located (weir) section. After 30 minutes all of the aggregates were still present in the same section.

EXAMPLE II

The procedure and apparatus of Example I was employed except that the interior openings (equilizer openings) associated with the forwardly located impellor had their nearest side (to the forwardly located impellor) located two inches rather than 3 inches from the flat surface forwardly located impellor. Each run in the Table below is a separate trial.

TABLE

| Run No. | Time (minutes) | Percent Aggregates Moved Between Sections |
|---|---|---|
| 1 | 6 | 17 |
| 2 | 15 | 50 |
| 3 | 30 | 58 |

TABLE-continued

| Run No. | Time (minutes) | Percent Aggregates Moved Between Sections |
|---|---|---|
| 4 | 60 | 75 |
| 5 | 120 | 92 |

The above test was repeated in the same way except that this time the aggregates were in the forwardly located (weir) section. After thirty minutes no aggregates were found in the backwardly located section.

EXAMPLE III

The procedure and apparatus of Example I was employed except that the aggregates used were less dense than those used in Examples I and II. These "potato chip" aggregates were light, fluffy aggregates. In a 30 minute period 42 percent of the aggregates had moved through the baffle from the backwardly located section to the forwardly located (weir) section.

What is claimed is:

1. A process for concentrating dense masses contained in solid particulate matter within a substantially circular cross-section, stirred, horizontal vessel comprising:
   a. rotating a centrally located drive shaft passing longitudinally through said vessel to which are attached
      i. a plurality of impellors, which impellors cause essentially no forward or backward movement of said particulate, the paddles of said impellors extending transversely within and to a short distance from the internal surfaces of said vessel, and
      ii. at least one baffle, each baffle essentially filling the cross-sectional area of said vessel and having at least two openings, one of said openings at the periphery of said baffle and another interior to said periphery;
   wherein said baffle has one backwardly and one forwardly located impellor having one or more paddles each closely spaced in respect of and rotating with said baffle, said backwardly located impellor so disposed in respect of said peripheral opening that dense masses engaged by said impellor tend to move through said peripheral opening only in the forward direction and said forwardly located impellor so disposed in respect of said interior opening that dense masses engaged by said impellor tend not to move through said interior opening in the backward direction; and
   b. removing said masses towards one end of said vessel.

2. The process of claim 1 wherein said particulate and said masses consist essentially of a polymeric material continuously forming in said vessel, which vessel is a polymerization reactor.

3. The process of claim 2 wherein said reactor is between about twenty and about eighty volume percent filled with said particulate.

4. The process of claim 3 wherein at least said backwardly and forwardly located impellors are two paddle impellors rotated about 90° with respect to one another, the two paddles of each of said forwardly and backwardly located impellors being disposed about 180° with respect to one another, and each baffle has one of said peripheral and one of said interior openings, both openings of similar areas.

5. The process of claim 4 wherein all of said impellors are two paddle impellors.

6. The process of claim 5 wherein said impellors are adjacently located along said shaft and each impellor is angularly off-set in respect of next adjacent impellors.

7. The process of claim 6 wherein said polymeric material is polyethylene or a copolymer thereof.

8. The process of claim 6 wherein said polymeric material is polypropylene or a copolymer thereof.

9. Apparatus comprising:
   a. a rotatable baffle of substantially circular cross-section having at least one peripheral and one interior opening, said openings positioned in adjoining quadrants of said baffle; and
   b. two impellors, each having one or more paddles, closely spaced in respect of said baffle, said two impellors located on opposite sides of said baffle;
   wherein one of said impellors is disposed with respect to said openings such that one side of said peripheral opening is about flush with and extends along a substantial portion of the length of one paddle of said impellor, and wherein said other impellor is disposed with respect to said interior opening such that a substantial distance exists between said impellor and the closest side of said interior opening.

10. The apparatus of claim 9 wherein said baffle contains one peripheral and one interior opening of similar areas, one impellor is rotated about 90° to the other, and each impellor has two paddles, said two paddles being disposed about 180° with respect to each other.

11. The apparatus of claim 10 wherein the total area of said openings is between about ten and about fifty percent of the area of said baffle.

12. The apparatus of claim 10 wherein the total area of said openings is between about twenty and about forty percent of the area of said baffle.

13. Internals for a stirred, horizontal vessel of substantially circular cross-section comprising:

a. a rotatable, centrally-located drive shaft passing longitudinally through said vessel to which are attached a plurality of impellors, which impellors cause essentially no forward or backward movement of solid particulate matter contained in said vessel and extend transversely within and to a short distance from the internal surfaces of said vessel;

b. at least one baffle attached to said shaft, each baffle essentially filling the cross-sectional area of said vessel and having at least two openings positioned in adjacent quadrants of said baffle, one of said openings at the periphery of said baffle and another interior to said periphery; and c. wherein each baffle has one forwardly and one backwardly located imepellor having one or more paddles each closely spaced in respect of and rotating with said baffle, said backwardly located impellor so disposed in respect of said peripheral opening that dense masses engaged by said impellor tend to move through said peripheral opening only in the forward direction and said forwardly located impellor so disposed in respect of said interior opening that dense masses engaged by said impellor tend not to move through said interior opening in the backward direction.

14. The internals of claim 13 wherein said vessel is a polymerization reactor and wherein at least said backwardly and forwardly located impellors are two paddle impellors rotated about 90° with respect to one another, the two paddles of said backwardly and forwardly located impellors being disposed about 180° with respect to one another, and each baffle has one of said peripheral and one of said interior openings, both openings of similar areas.

15. The internals of claim 14 wherein all of said impellors are two paddle impellors.

16. The internals of claim 15 wherein said impellors are adjacently located along said shaft and each impellor is angularly off-set in respect of next adjacent impellors.

* * * * *

UNITED STATES PATENT OFFICE
CERTIFICATE OF CORRECTION

Patent No. 4,021,024      Dated May 3, 1977

Inventor(s) Michael A. Stasi

It is certified that error appears in the above-identified patent and that said Letters Patent are hereby corrected as shown below:

Column 5, line 18 "square opening with" should be -- square opening was

" 6, " 42 "wherein said baffle" should be -- wherein each baffle

Signed and Sealed this nineteenth Day of July 1977

[SEAL]

Attest:

RUTH C. MASON
*Attesting Officer*

C. MARSHALL DANN
*Commissioner of Patents and Trademarks*